United States Patent [19]
Okuno

[11] Patent Number: 6,145,241
[45] Date of Patent: Nov. 14, 2000

[54] ELECTRIC INSECTICIDAL APPARATUS

[76] Inventor: Yoshitoshi Okuno, 5-10-58, Toba, Toba-shi, Mie, Japan

[21] Appl. No.: 09/186,352

[22] Filed: Nov. 5, 1998

[30] Foreign Application Priority Data

Nov. 7, 1997 [JP] Japan .................................. 9-306164

[51] Int. Cl.[7] .............................. A01M 13/00; A05B 1/24
[52] U.S. Cl. ........................... 43/129; 239/136; 239/145; 239/44; 222/187; 392/395; 392/406
[58] Field of Search .............................. 43/129, 125, 131, 43/124, 132.1; 239/135, 136, 139, 145, 44, 49; 222/187; 392/395, 406

[56] References Cited

U.S. PATENT DOCUMENTS

| | | | |
|---|---|---|---|
| 4,745,705 | 5/1988 | Yamamoto | 43/125 |
| 4,874,924 | 10/1989 | Yamamoto | 219/274 |
| 4,891,904 | 1/1990 | Tabita | 43/112 |
| 5,095,647 | 3/1992 | Zobele | 43/125 |
| 5,161,646 | 11/1992 | Aurich | 222/187 |
| 5,222,186 | 6/1993 | Schimanski | 392/395 |
| 5,290,546 | 3/1994 | Hasegawa | 424/76.2 |
| 5,484,086 | 1/1996 | Pu | 222/187 |
| 5,644,866 | 7/1997 | Katsuda | 43/129 |
| 5,647,053 | 7/1997 | Schroeder | 392/390 |
| 5,903,710 | 5/1999 | Wefler | 392/392 |

FOREIGN PATENT DOCUMENTS

| | | |
|---|---|---|
| 0722742 | 7/1996 | European Pat. Off. . |
| 4131613 | 3/1993 | Germany . |
| 8-244842 | 9/1996 | Japan . |
| 2275608 | 9/1994 | United Kingdom . |

*Primary Examiner*—Jack W. Lavinder
*Attorney, Agent, or Firm*—Birch, Stewart, Kolasch & Birch, LLP

[57] ABSTRACT

An electric insecticidal apparatus comprising a vessel for storing insecticidal solution, which is oriented in a direction in use; a heating chamber in which the vessel is mounted, said heating chamber containing a heating element; a wick for drawing up the insecticidal solution in the vessel, said wick being provided in the vessel such that the insecticidal solution drawn up by the wick is heated and vaporized by the heating element; an inlet provided at a side of the heating chamber for inserting the vessel into the heating chamber, said vessel being laterally inserted into the heating chamber through the inlet by orienting the vessel in the proper direction; and a guide and holding means for guiding the wick to and holding the wick at a predetermined position at the time of insertion of the vessel into the heating chamber such that the wick confronts the heating element of the heating chamber at a predetermined distance from the heating element, which is provided in the heating chamber.

6 Claims, 8 Drawing Sheets

ELECTRIC INSECTICIDAL APPARATUS

BACKGROUND OF THE INVENTION

1. Field of the Invention

The present invention relates to an electric insecticidal apparatus which is used by mounting in a heating device a vessel for storing an insecticidal solution.

2. Description of the Prior Art

In recent years, electric insecticidal apparatuses are widely used in which an insecticidal solution is stored in a vessel mounted on a heating device and a heating element of the heating device heats a wick inserted into the vessel so as to, vaporize the insecticidal solution absorbed by the wick whereby the insecticide is dispersed into the atmosphere. In these conventional electric insecticidal apparatus, since the period of service of the insecticidal vessel is quite long, some of the conventional electric insecticidal apparatus can be effectively used successively for dozens of days without the need for replacing the insecticidal vessel with a new one.

However, in these currently commercially available electric insecticidal apparatus, the insecticidal vessel for storing the insecticidal solution has a very sophisticated construction in which a special rodlike liquid-absorbing wick made of an inorganic mineral and an organic material is inserted into the vessel and an inner stopper for fixing the wick in place and preventing leakage of the insecticidal solution is mounted on the vessel. Furthermore, a threaded lid for sealing the insecticide within the vessel when the vessel is not in use is provided on the vessel. Therefore, the vessel becomes rather expensive.

On the other hand, an electric insecticidal apparatus designed to be produced at lower cost is disclosed in Japanese Patent Laid-Open Publication No. 8-244842 (1996). In this known electric insecticidal apparatus, a vessel 50 for storing insecticidal solution is made of plastic and has at least two chambers 51 and 52 formed by deep drawing as shown in FIG. 12. The insecticidal solution is encapsulated in the chamber 51 and a flaky wick 53 extends from the chamber 51 into the chamber 52. The chamber 51 is sealed together with the wick 53 by a cover 54, while the chamber 52 is sealed by a removable foil 55. When the vessel 50 is used, the wick 53 is exposed by peeling the foil 55. Then, as shown in FIG. 13, the vessel 50 is inserted into a housing 56 of a heating device including a heating element 57 and the insecticide is dissipated by heating with the heating element 57, the distal end of the which distal end confronts the heating element 57.

However, in this known electric insecticidal apparatus, when the vessel 50 is mounted on the housing 56 of the heating device, the vessel 50 is inserted into the housing 56 from an inlet 59 upwardly in the direction of the arrow C in FIG. 13. Therefore, in case the vessel 50 is replaced with a new one while an electric plug 58 is being received in a receptacle, it is difficult to perform replacement of the vessel 50. Hence, the housing 56 is made rotatable relative to the electric plug 58 as shown by the arrow D in FIG. 13. Therefore, in such a case, the inlet 59 of the housing 56 is directed sidewise or upwardly at the time of replacement of the vessel 50 and is returned to its original direction shown in FIG. 13 after replacement of the vessel 50.

Nevertheless, in this known electric insecticidal apparatus, since the wick 53 is flaky, it is difficult to maintain a distance between the wick 53 and the heating element 57 constant and it is necessary to insert the vessel 50 into the housing 56 with much care. Meanwhile, since the housing 56 is required to be rotated relative to the electric plug 58 in case replacement of the vessel 50 is performed while the electric plug 58 is being received in the receptacle, such problems arise that the number of operational steps for replacing the vessel 50 with a new one increases and contact of rotational portions of the housing 56 and the electric plug 58 with each other may readily become improper due to wear of the rotational portions of the housing 56 and the electric plug 58.

SUMMARY OF THE INVENTION

Accordingly, an essential object of the present invention is to provide, with a view to eliminating the above mentioned drawbacks of prior art electric insecticidal apparatus, an electric insecticidal apparatus in which replacement of a vessel can be performed easily with less of operational steps.

In order to accomplish this object of the present invention, an electric insecticidal apparatus according to the present invention comprises: a vessel for storing insecticidal solution, which is oriented in a direction in use; a heating device on which the vessel is mounted and which includes a heating element; a wick for sucking up the insecticidal solution in the vessel, which is provided in the vessel; wherein the insecticidal solution sucked up by the wick is heated by the heating element of the heating device so as to be vaporized; wherein an inlet for inserting the vessel into the heating device is provided at a side of the heating device and the vessel is laterally inserted into the heating device from the inlet by orienting the vessel in the direction; and a guide and holding means for, at the time of insertion of the vessel into the heating device, guiding the wick to and holding the wick at a predetermined position such that the wick confronts the heating element of the heating device at a predetermined distance from the heating element, which is provided in the heating device.

In accordance with the present invention, when the vessel is laterally inserted into the heating device from the inlet provided at the side of the heating device, the wick of the vessel is guided to and held at the predetermined position by the guide and holding means such that the wick confronts the heating element of the heating device at the predetermined distance from the heating element. Therefore, since the vessel can be replaced with a new one by orienting the vessel and the heating device in the direction taken by the vessel and the heating device in use, replacement of the vessel can be performed easily with a less number of operational steps.

BRIEF DESCRIPTION OF THE DRAWINGS

This object and features of the present invention will become apparent from the following description taken in conjunction with the preferred embodiments thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Figure 1:
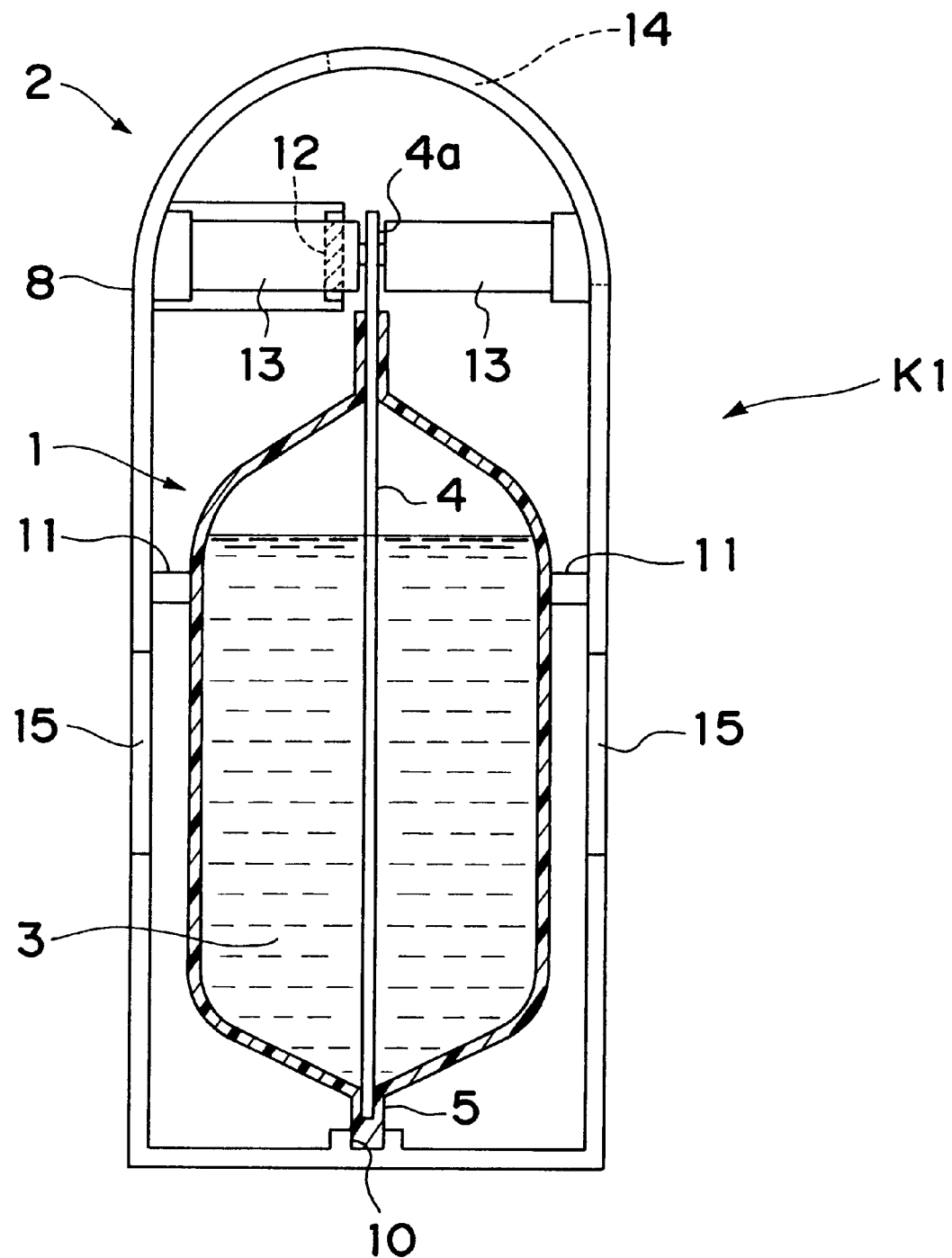
FIG. 1 is a schematic sectional view of an electric insecticidal apparatus according to a first embodiment of the present invention, in which a vessel is mounted on a heating device.
Figure 2:
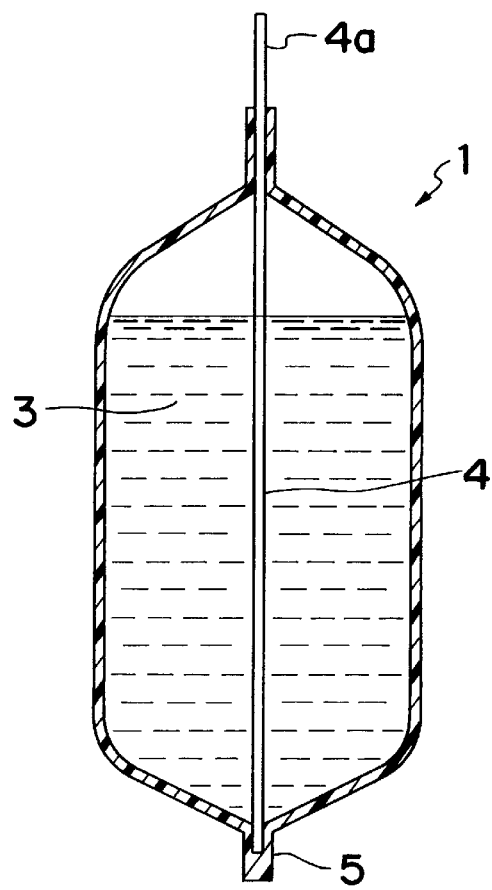
FIG. 2 is a sectional view of the vessel of FIG. 1.

Hereinafter, an electric insecticidal apparatus K1 according to a first embodiment of the present invention is described with reference to FIGS. 1 to 7. As shown in FIG. 1, the electric insecticidal apparatus K1 is used in a state where a vessel 1 for storing the insecticidal solution 3 is mounted in a heating device or heating chamber 2. As shown in FIG. 2, the vessel 1 has a bottlelike shape formed by bonding two deep drawn plastic plates or the like to each other. The insecticidal solution 3 is stored in the vessel 1 and a ribbonlike wick 4 is inserted into the vessel 1. The wick 4 extends in the vessel 1 substantially rectilinearly from a lower end portion of the vessel 1 such that an upper end portion 4a (referred to as a "lip", hereinafter) of the wick 4 projects out of the vessel 1.

In the manufacturing process of the vessel 1, the plastic plates or the like are bonded to each other by heat sealing and thus, burrs are produced around the vessel 1 so as to form flange portions around the vessel 1. The flange portions formed on a side of the vessel 1 may be chipped off but at least the flange portions formed at a lower portion of the vessel 1 are left as they are without being chipped off. The unchipped flange portions are used as a guide 5 for mounting the vessel 1 in the heating device 2 but may also be used for fixedly gripping the lower end of the wick 4.

Figure 3:
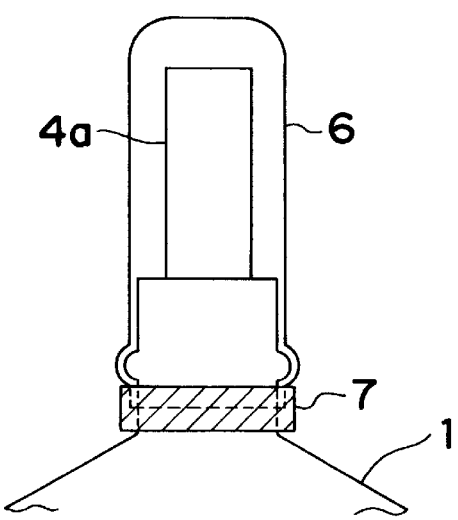
FIG. 3 is a view explanatory of a method of sealing the vessel of FIG. 1.

Furthermore, when it is not in use, the vessel 1 should be sealed so as to prevent leakage of the insecticidal solution 3 from the vessel 1. To this end, a cap 6, for example, is mounted on the vessel 1 so as to cover the lip 4a of the wick 4 as shown in FIG. 3. A boundary portion between the cap 6 and the vessel 1 is sealed by a sealing tape 7. Therefore, when the vessel 1 is used, the sealing tape 7 is initially peeled from the boundary portion between the cap 6 and the vessel 1 and then, the cap 6 is removed from the vessel 1, thereby resulting in a usable state of the vessel 1. Meanwhile, the shape, material and dimensions of the vessel 1 are not specifically restricted and a method of sealing the vessel 1 when the vessel 1 is not in use is not limited to the above described method.

Figure 4:
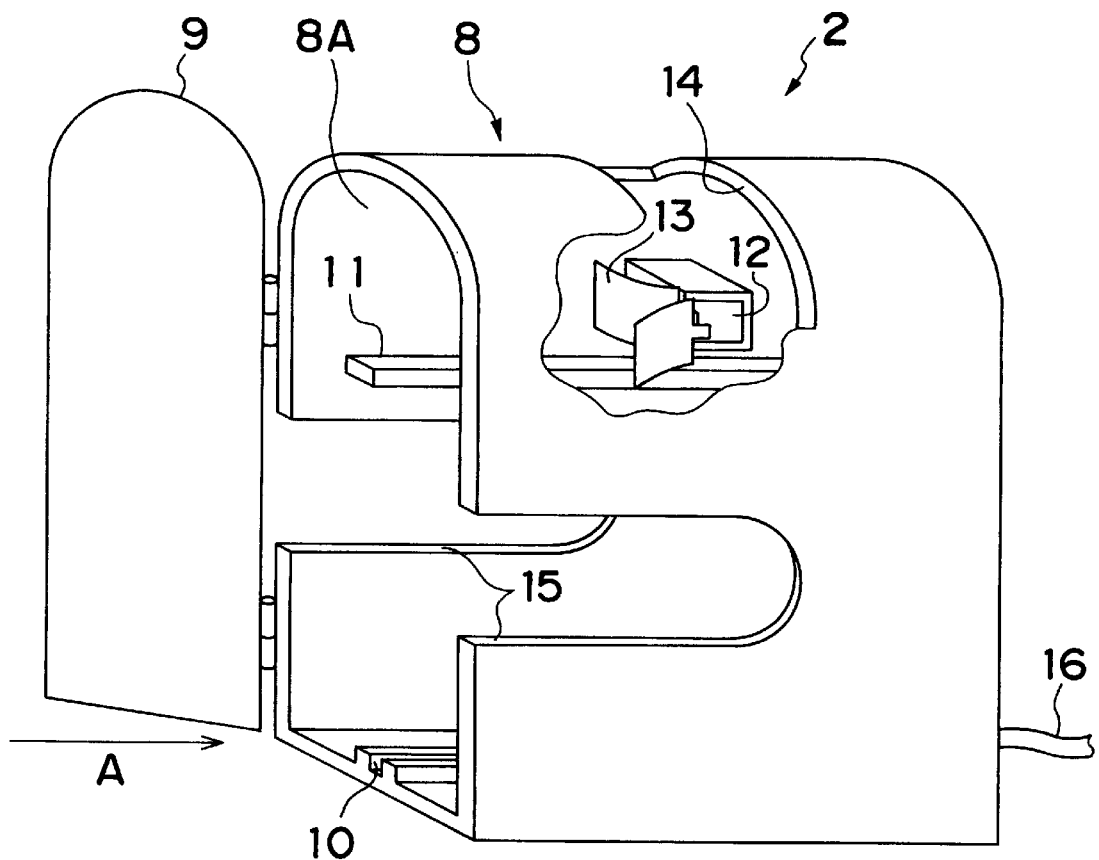
FIG. 4 is a perspective view of the heating device of FIG. 1.

As shown in FIG. 4, the heating device 2 in which the vessel 1 is to be mounted includes a housing 8 and a lid 9 for covering a side opening 8A of the housing 8. When the vessel 1 is mounted in the heating device 2, the lid 9 is opened and then, the vessel 1 is inserted into the housing 8 from the side opening 8A laterally in the direction of the arrow A in FIG. 4 by orienting the vessel 1 in a direction taken by the vessel 1 in use. Therefore, when the lid 9 has is open, the side opening 8A of the housing 8 acts as an inlet for inserting the vessel 1 into the heating device 2. A guide groove 10 for receiving the guide 5 of the vessel 1 is provided on an inner face of a bottom wall of the housing 8 and constitutes together with the guide 5 of the vessel 1 a guide means for guiding the vessel 1 into the housing 8. The guide 5 of the vessel 1 is brought into engagement with the guide groove 10 of the heating device 2 such that the vessel 1 is guided into the housing 8. As shown in FIGS. 1 and 4, a pair of supports 11 for supporting opposite side faces of the vessel 1 mounted on the heating device 2 are, respectively, provided on the inner faces of opposite side walls of the housing 8. Therefore, when the vessel 1 is mounted on the heating device 2, the vessel 1 is set at a predetermined sidewise location of the housing 8 in FIG. 1 by the guide groove 10 and the supports 11.

Meanwhile, a heating element 12 for generating heat and a pair of lip holding plates 13 acting as a guide and holding means for guiding the wick 4 to and holding the wick 4 at a predetermined position are provided in the housing 8. The heating element 12 heats the lip 4a of the wick 4 through thermal radiation so as to promote vaporization of the insecticidal solution 3 sucked up by the lip 4a. The lip holding plates 13 are arranged to properly maintain a distance between the heating element 12 and the lip 4a. Furthermore, a dissipation outlet 14 for dissipating the vaporized insecticide into atmosphere is formed at an upper portion of the housing 8 and a pair of slots 15 are, respectively, formed on the opposite side walls of the housing 8. The dissipation outlet 14 is formed by a relatively large opening in FIG. 4 but may also be formed by, for example, such a narrow slit as to prevent entry of a child's finger thereinto. The slots 15 are provided such that not only removal of the vessel 1 from the heating device 2 at the time of replacement of the vessel 1 is facilitated through the slots 15 but a user can visually inspect residual quantity of the insecticidal solution 3 in the vessel 1 through the slots 15.

As shown in FIG. 4, an electric cord 16 acting as a power supply means for supplying electric power to the heating element 12 is provided on the heating device 2 so as to be connected to a receptacle. However, alternatively, such an arrangement may also be employed in which an electric plug is formed integrally with the housing 8 such that the heating device 2 is directly connected to the receptacle by inserting the electric plug into the receptacle. In addition, if a battery is used as a power source, the electric insecticidal apparatus K1 can be made portable for outdoor use. Shape, material and dimensions of the heating device 2 are not specifically restricted.

Hereinafter, a method of mounting the vessel 1 in the heating device 2 is described. Initially, since the vessel 1 before use is sealed by the cap 6 and the sealing tape 7, the sealing tape 7 and the cap 6 are sequentially removed from the vessel 1 so as to unseal the vessel 1 as described earlier. The thus unsealed vessel 1 is inserted into the housing 8 of the heating device 2 from the side opening 8A laterally in the direction of the arrow A in FIG. 4 by fitting the guide 5 of the vessel 1 into the guide groove 10 of the heating device 2. At this time, the vessel 1 is fixed at the predetermined sidewise location of the heating device 2 in FIG. 1 by the guide groove 10 and the supports 11. Meanwhile, when the vessel 1 has been laterally inserted up to the predetermined position in the heating device 2, further insertion of the vessel 1 into the heating device 2 is prohibited. At this predetermined position in the heating device 2, the lip 4a of the wick 4 is adapted to confront the heating element 12 of the heating device 2.

Figure 5:
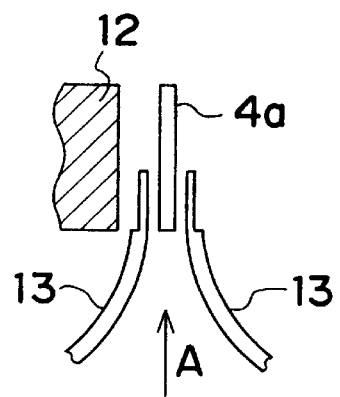
FIG. 5 is a top plan view showing a lip of a wick, a heating element and lip holding plates in the heating device of FIG. 1 having the vessel mounted thereon.
Figure 6:
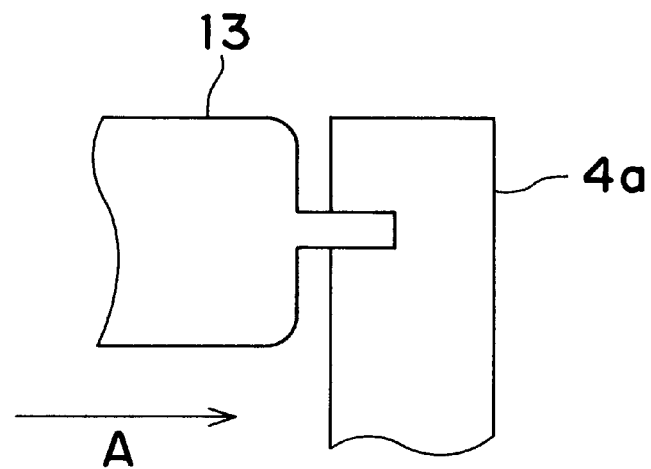
FIG. 6 is a side elevational view showing the lip and the lip holding plate in FIG. 5.
Figure 7:
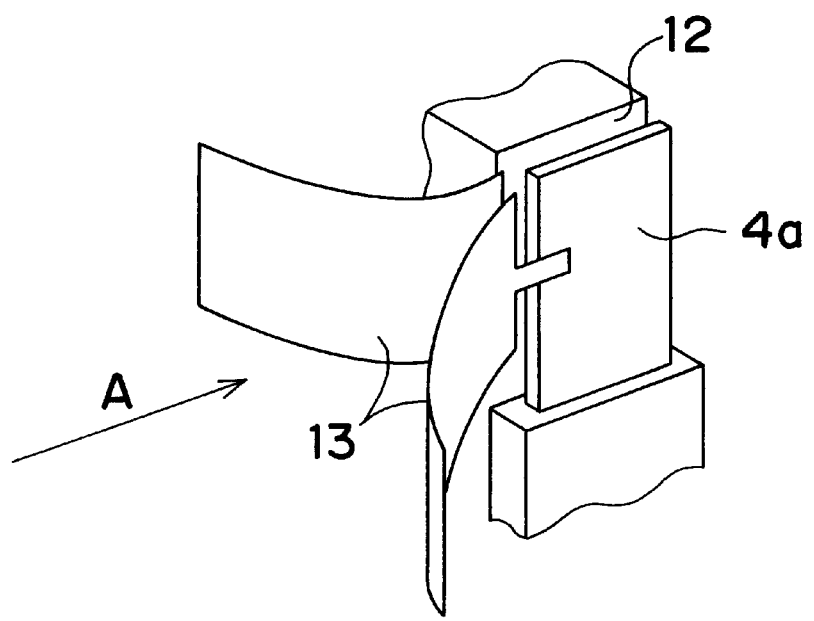
FIG. 7 is a perspective view showing the lip, the heating element and the lip holding plates in FIG. 5.

Meanwhile, as shown in FIGS. 5 to 7, the lip 4a is guided to the predetermined position by the lip holding plates 13 so as to confront the heating element 12 at a proper distance from the heating element 12. The lip holding plates 13 are, for example, formed by two metallic or heat-resistant resinous sheets. As shown in FIG. 5, a distance between the lip holding plates 13 is made large at an upstream side in the direction of the arrow A for inserting the vessel 1 into the heating device 2 so as to gradually decrease towards a downstream side in the direction of the arrow A. Since the lip 4a is not so thick as to have a sufficient strength, it is desirable that an interval between distal end portions of the lip holding plates 13 is set to be slightly larger than a thickness of the lip 4a such that the lip holding plates 13 do not prevent advance of the lip 4a therebetween.

Furthermore, at the time the vessel 1 has reached the predetermined position in the heating device 2, the lip 4a is gripped between the distal end portions of the lip holding plates 13 and thus, the lip 4a is held at the proper distance from the heating element 12. However, as shown in FIGS. 6 and 7, the lip holding plate 13 is made narrower at the distal end portion than the remaining portion so as to minimize quantity of radiation heat of the heating element 12 intercepted from the lip 4a.

After the vessel 1 has been laterally inserted up to the predetermined position in the heating device 2, the lid 9 is closed. The lid 9 may be fixed by a simple arrangement such as a hook but may also be locked by a locking flap or the like such that children, etc. do not open the lid 9 inadvertently. After the vessel 1 has been mounted on the heating device 2 as described above, the heating element 12 is actuated by turning on a switch or the like, so that the insecticidal solution 3 sucked up by the lip 4a is vaporized by the heating element 12 and is dissipated outwardly from the dissipation outlet 14. The wick 4 continues to supply the insecticidal solution 3 to the lip 4a by capillary action until the insecticidal solution 3 in the vessel 1 is depleted. Meanwhile, the above mentioned switch may be eliminated by employing an arrangement in which the heating element 12 is held in the ON state at all times when the electric cord 16 is connected to the receptacle.

When the insecticidal solution 3 in the vessel 1 has been depleted, the old vessel 1 is removed from the heating device 2 and is replaced with a new vessel 1. The old vessel 1 is gripped with fingers by inserting the fingers into the housing 8 from the slots 15 so as to be pulled outwardly.

As described above, when the vessel 1 is mounted in the heating device 2 in the electric insecticidal apparatus K1, the vessel 1 is laterally inserted into the housing 8 of the heating device 2 from the side opening 8A Therefore, in the electric insecticidal apparatus K1, since the vessel 1 can be replaced with a new one by orienting the vessel 1 and the heating device 2 in the direction taken by the vessel 1 and the heating device 2 in use, replacement of the vessel 1 can be performed quite simply without the need for turning the heating device 2, namely, with a less number of operational steps.

Meanwhile, when the vessel 1 is laterally inserted into the heating device 2, the vessel 1 is guided by the guide 5 and the guide groove 10. Therefore, the vessel 1 can be stably inserted into the heating device 2. In addition, since the flange portions formed by burrs produced necessarily during molding of the vessel 1 by heat sealing or the like can be used as the guide 5, shape of the vessel 1 can be simplified.

Furthermore, in the electric insecticidal apparatus K1, the vessel 1 is arranged to be laterally inserted into the heating device 2. However, also in case an arrangement is employed in which the vessel 1 is adapted to be downwardly inserted into the heating device 2 from above, replacement of the vessel 1 can be facilitated. An electric insecticidal apparatus K2 according to a second embodiment of the present invention employs this arrangement and is described with reference to FIGS. 8 to 11, hereinafter.

Figure 8:
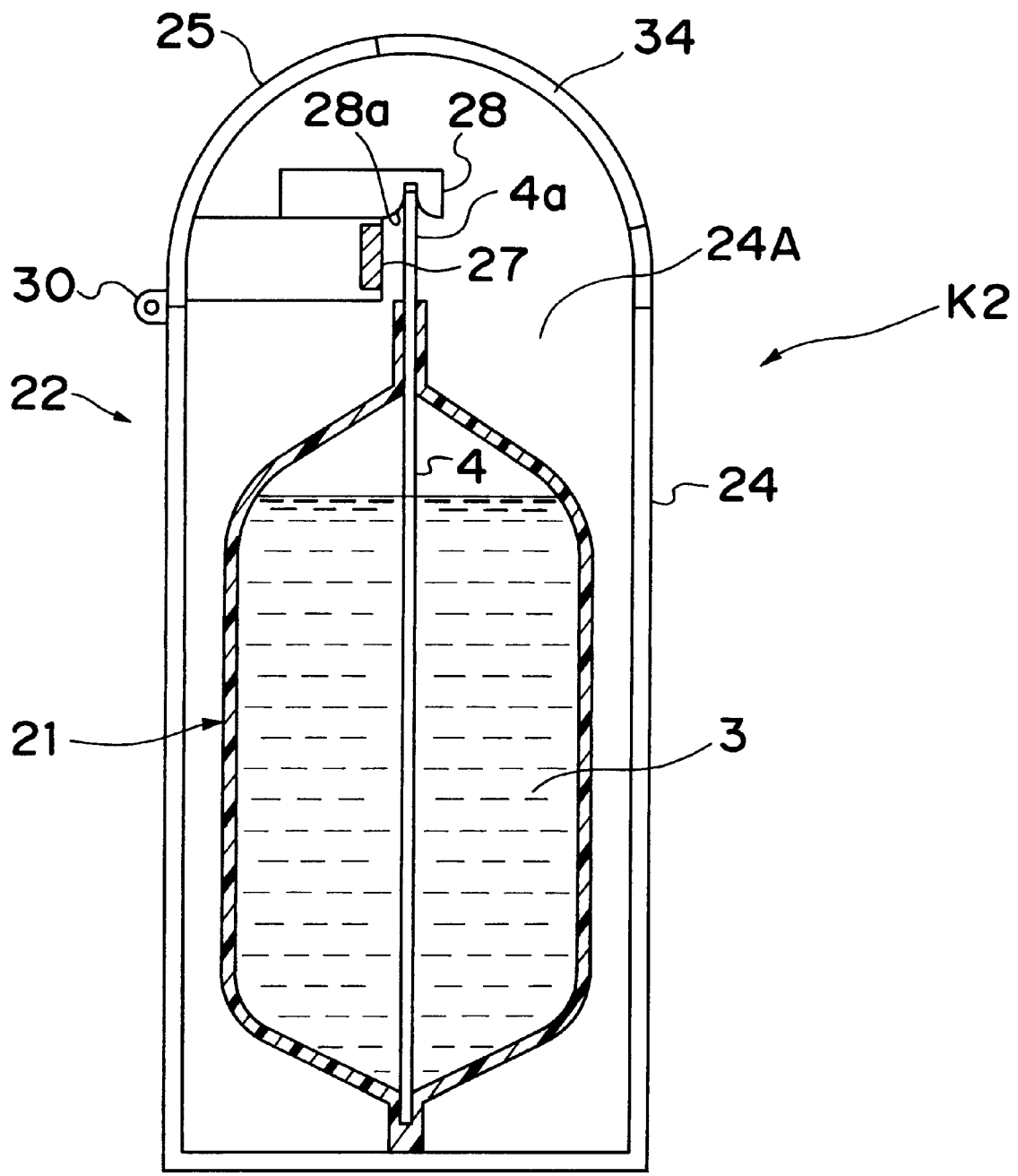
FIG. 8 is a schematic sectional view of an electric insecticidal apparatus according to a second embodiment of the present invention, in which a vessel is mounted on a heating device.
Figure 9:
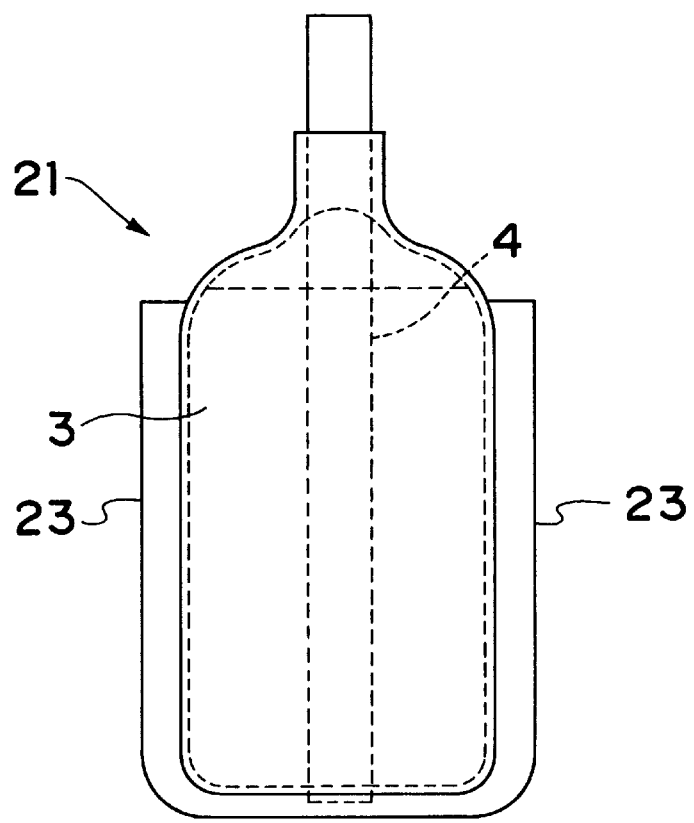
FIG. 9 is a front elevational view of the vessel of FIG. 8.
Figure 11:
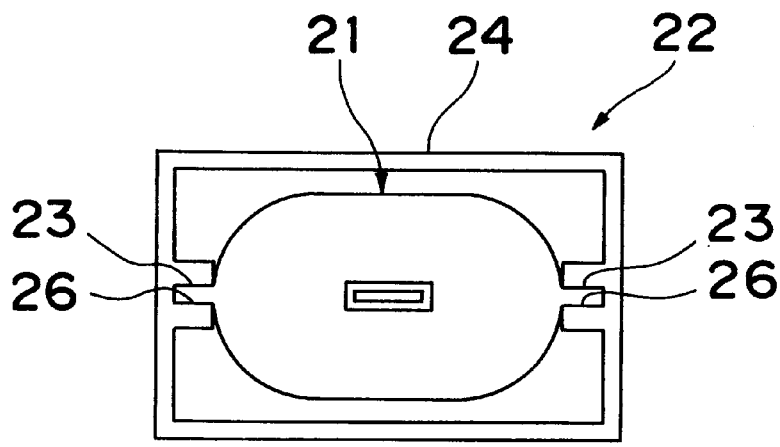
FIG. 11 is a top plan view showing the vessel mounted on the heating device in the electric insecticidal apparatus of FIG. 8.
Figure 12:
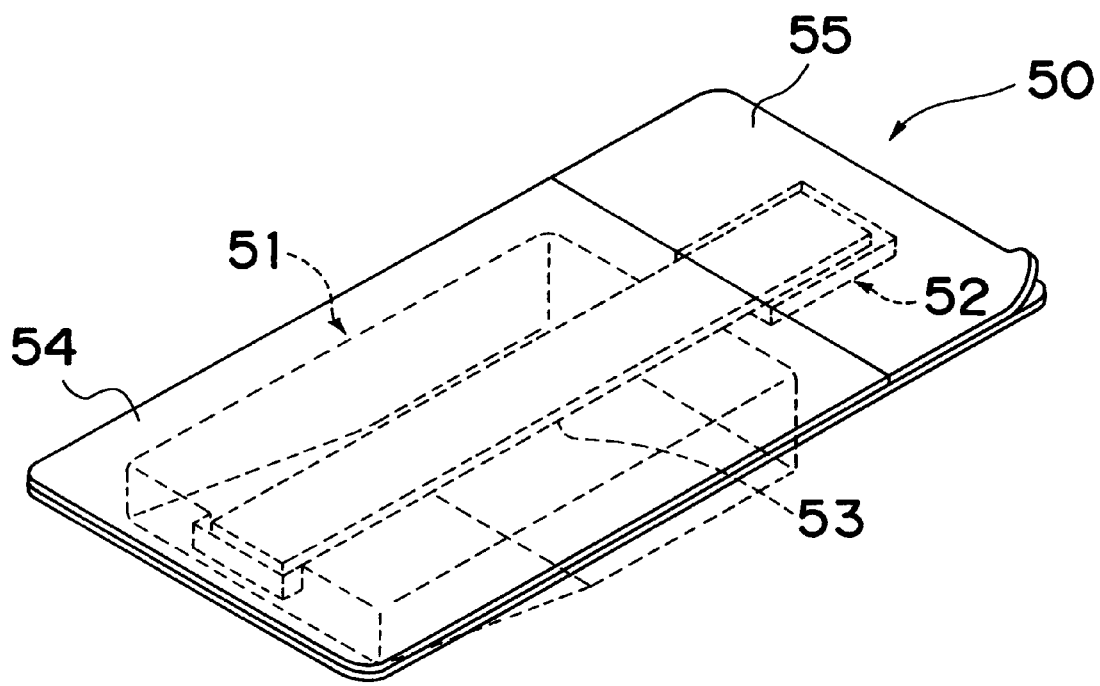
FIG. 12 is a perspective view of a vessel employed in a prior art electric insecticidal apparatus (already referred to)
Figure 13:
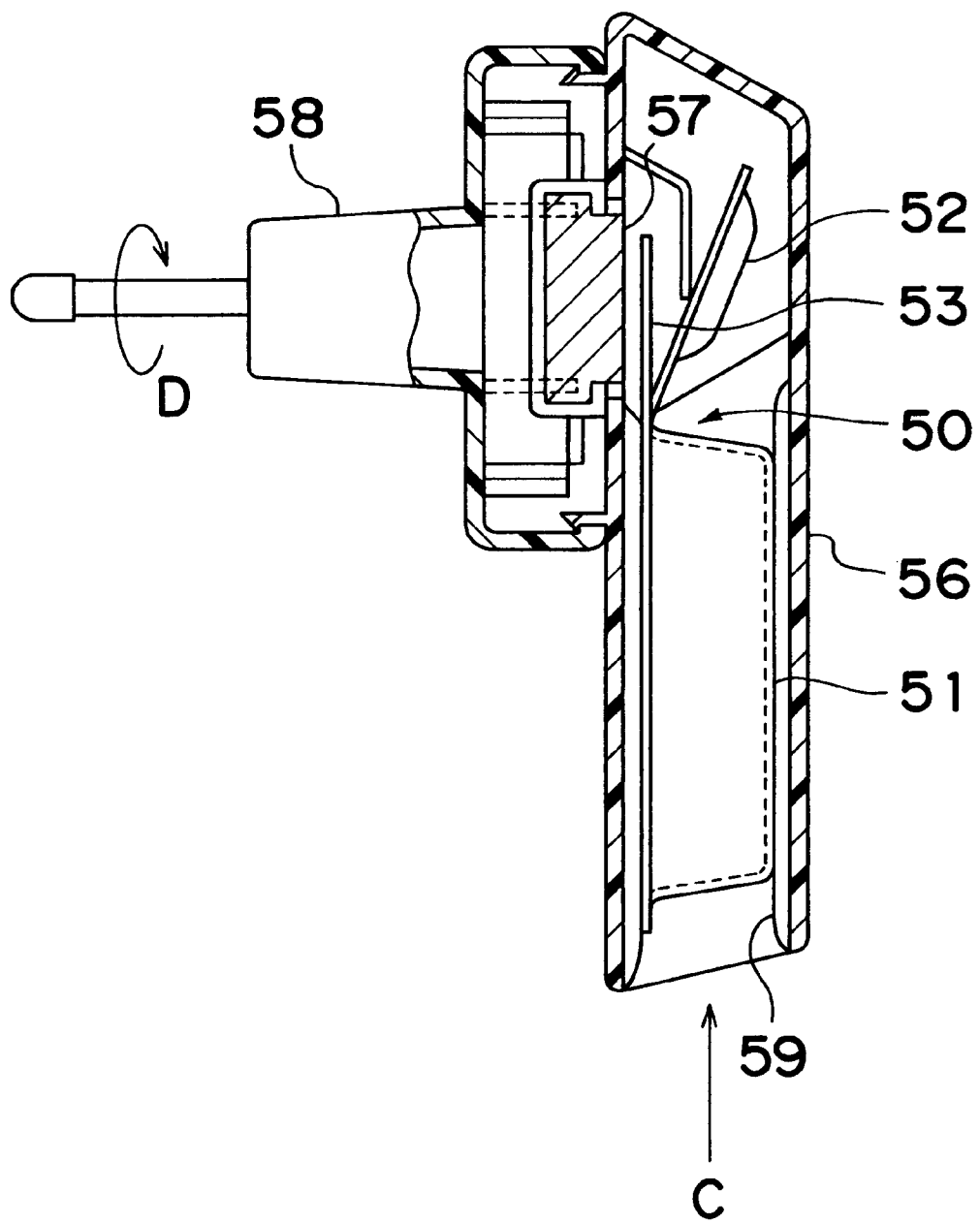
FIG. 13 is a sectional view of the prior art electric insecticidal apparatus of FIG. 12 (already referred to).

As shown in FIG. 8, the electric insecticidal apparatus K2 includes a vessel 21 and a heating device 22. As shown in FIG. 9, the vessel 21 is formed by bonding two deep drawn plastic plates to each other by heat sealing in the same manner as the vessel 1 of the electric insecticidal apparatus K1. However, in the vessel 21, flange portions formed by burrs produced on its opposite sides by heat sealing are not chipped off but are used as a pair of guides 23 when the vessel 21 is mounted in the heating device 22 as shown in FIG. 11. Since other constructions of the vessel 21 are similar to those of the vessel 1, the description is abbreviated for the sake of brevity.

Figure 10:
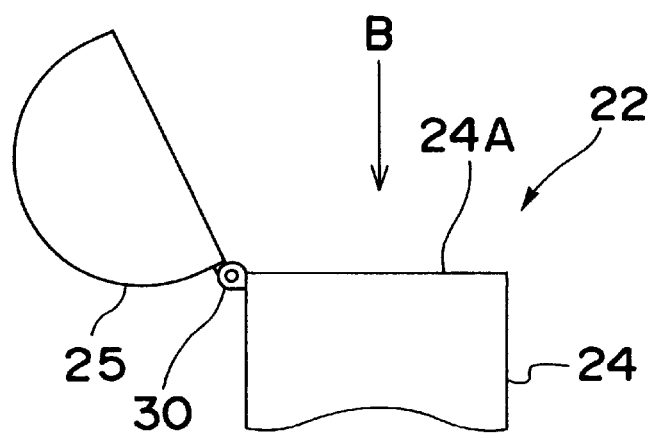
FIG. 10 is a schematic fragmentary view showing a housing and a lid of the heating device of FIG. 8.

On the other hand,. as shown in FIG. 10, the heating device 22 is constituted by a housing 24 and a lid 25 for covering an upper opening 24A of the housing 24. The lid 25 is provided at an upper portion of the housing 24 and can be opened or closed by, for example, a hinge 30. A slitlike dissipation outlet 34 for dissipating vaporized insecticide into atmosphere is formed at a portion of the lid 25. As shown in FIG. 11, a pair of guide grooves 26 for receiving the guides 23 of the vessel 21 are, respectively, provided on inner faces of opposite side walls of the housing 24 and constitute together with the guides 23 of the vessel 21 a guide means for guiding the vessel 21 into the housing 24. The guides 23 of the vessel 21 are, respectively, brought into engagement with the guide grooves 26 of the housing 24 such that the vessel 21 is guided into the housing 24. Meanwhile, as shown in FIG. 8, a heating element 27 for generating heat and a lip holder 28 acting as a wick holding means for holding the wick 4 at a predetermined position are provided on the lid 25.

In case the vessel 21 is mounted in the heating device 22, the vessel 21 is inserted, in a state where not only the lid 25 is opened but the guides 23 of the vessel 21 are, respectively, fitted into the guide grooves 26 of the heating device 22, into the heating device 22 from the upper opening 24A downwardly in the direction of the arrow B in FIG. 10 by orienting the vessel 21 in a direction taken by the vessel 21 in use. In the electric insecticidal apparatus K2, when the lid 25 is opened, the upper opening 24A of the housing 24 acts as an inlet for inserting the vessel 21 into the heating device 22.

After the vessel 21 has been downwardly inserted into the heating device 22, the lid 25 is closed. At this time, the lip 4a of the wick 4 is fitted into a recess 28a of the lip holder 28 so as to be held at a proper distance from the heating element 27. Since operations subsequent to mounting of the vessel 21 on the heating device 22 in the electric insecticidal apparatus K2 are similar to those of the electric insecticidal apparatus K1, the description is abbreviated for the sake of brevity.

In the electric insecticidal apparatus K2, when the vessel 21 is mounted on the heating device 22, the vessel 21 is downwardly inserted into the heating device 22 from the upper opening 24A from above. Therefore, also in the electric insecticidal apparatus K2, since the vessel 21 can be replaced with a new one by orienting the vessel 21 and the heating device 22 in the direction taken by the vessel 21 and the heating device 22 in use, replacement of the vessel 21 can be performed quite simply without the need for turning the heating device 22, namely, with a less number of operational steps in the same manner as the electric insecticidal apparatus K1.

As is clear from the foregoing description, the following effects are obtained in the present invention.

(1) In the electric insecticidal apparatus K1 according to the first embodiment of the present invention, the inlet for inserting the vessel into the heating device is provided at the side of the heating device and the vessel is laterally inserted into the heating device from the inlet by orienting the vessel in the direction taken by the vessel in use. In addition, the heating device includes the guide and holding means for, at the time of insertion of the vessel into the heating device, guiding the wick to and holding the wick at the predetermined position such that the wick confronts the heating element of the heating device at the predetermined distance from the heating element.

By this arrangement of the electric insecticidal apparatus K1, when the vessel is laterally inserted into the heating device from the inlet provided at the side of the heating device, the wick of the vessel is guided to and held at the predetermined position by the guide and holding means such that the wick confronts the heating element of the heating device at the predetermined distance from the heating element. Therefore, since the vessel can be replaced with a new one by orienting the vessel and the heating device in the direction taken by the vessel and the heating device in use, such an effect is gained that replacement of the vessel can be performed easily with a less number of operational steps.

(2) Meanwhile, in the electric insecticidal apparatus K1, the above mentioned guide and holding means is formed by the two metallic or heat-resistant resinous sheets provided on the heating device and the distance between the sheets is made large at the upstream side in the direction of insertion of the vessel into the heating device so as to gradually decrease towards the downstream side in the direction of insertion of the vessel into the heating device. When the vessel is laterally inserted into the heating device, the wick is guided between the sheets and is gripped by the distal end portions of the sheets at the predetermined position so as to be held at the predetermined position at the predetermined distance from the heating element.

By this arrangement of the electric insecticidal apparatus K1, when the vessel is laterally inserted into the heating device, the wick is guided between the sheets and is gripped by the distal end portions of the sheets at the predetermined position so as to be held at the predetermined position at the predetermined distance from the heating element. As a result, such an effect is achieved that structure of the guide and holding means can be made quite simple.

(3) In the electric insecticidal apparatus K2 according to the second embodiment of the present invention, the heating device is formed, at its upper portion, with the inlet for inserting the vessel into the heating device and includes the lid for opening or closing the inlet such that the vessel is downwardly inserted into the heating device from the inlet by orienting the vessel in the direction taken by the vessel in use. In addition, the heating element and the wick holding means for holding the wick of the vessel at the predetermined position such that the wick confronts the heating element at the predetermined distance from the heating element are provided on the lid. By closing the lid after the vessel has been downwardly inserted into the heating device, the wick is held at the predetermined position by the wick holding means so as to confront the heating element at the predetermined distance from the heating element.

By this arrangement of the electric insecticidal apparatus K2, the vessel is downwardly inserted into the heating device from the inlet provided at the upper portion of the heating device. When the lid provided with the heating element and the wick holding means is closed after insertion of the vessel into the heating device, the wick of the vessel is guided to and held at the predetermined position by the wick holding means so as to confront the heating element of the heating device at the predetermined distance from the heating element. Therefore, since the vessel can be replaced with a new one by orienting the vessel and the heating device in the direction taken by the vessel and the heating device in use, such an effect is gained that replacement of the vessel can be performed easily with a less number of operational steps.

(4) In the electric insecticidal apparatuses K1 and K2, the guide means for guiding the vessel into the heating device is provided and includes the guide provided on the vessel and the guide groove provided on the heating device and engageable with the guide. Furthermore, the flange portion is formed by the burrs produced during the molding process of the vessel and is used as the guide.

By this arrangement of the electric insecticidal apparatuses K1 and K2, since the vessel is guided by the guide means when the vessel is inserted into the heating device, the vessel can be inserted into the heating device stably. Meanwhile, such an effect is gained that since the flange portion formed by the burrs produced necessarily during molding of the vessel by heat sealing or the like is used as the guide, shape of the vessel can be simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric insecticidal apparatus comprising:
   a vessel for storing insecticidal solution, which is oriented in a direction in use;
   a heating chamber in which the vessel is mounted, said heating chamber containing a heating element;
   a wick for drawing up the insecticidal solution in the vessel, said wick being provided in the vessel such that the insecticidal solution drawn up by the wick is heated and vaporized by the heating element;
   an inlet provided at a side of the heating chamber for inserting the vessel into the heating chamber, said vessel being laterally inserted into the heating chamber through the inlet by orienting the vessel in the proper direction; and
   a guide and holding device including two converging members guiding the wick to and holding the wick at a predetermined position, such that the wick is spaced from the heating element by a predetermined distance.

2. The electric insecticidal apparatus as claimed in claim 1, further comprising:
   a guide provided on the vessel and a guide groove provided in the heating chamber and engageable with the guide;
   wherein a flange portion is formed by burrs produced during a molding process of the vessel and is used as the guide.

3. The electric insecticidal apparatus as claimed in claim 1, wherein the two converging members are formed by two metallic or heat-resistant resinous sheets and the distance between the sheets is made large at an upstream side in the direction of insertion of the vessel into the heating device so as to gradually converge towards a downstream side in the direction of insertion of the vessel into the heating chamber;

wherein when the vessel is inserted into the heating chamber, the wick is guided between the sheets and is gripped by distal end portions of the sheets at the predetermined position, so as to be held at the predetermined position and at the predetermined distance from the heating element.

4. The electric insecticidal apparatus as claimed in claim 3, further comprising:

a guide provided on the vessel and a guide groove provided in the heating chamber and engageable with the guide;

wherein a flange portion is formed by burrs produced during a molding process of the vessel and is used as the guide.

5. An electric insecticidal apparatus comprising:

a vessel for storing insecticidal solution, which is oriented in a direction in use;

a heating chamber in which the vessel is mounted, said heating chamber containing a heating element;

a wick for drawing up the insecticidal solution in the vessel, said wick being provided in the vessel such that the insecticidal solution drawn up by the wick is heated and vaporized by the heating element;

an inlet provided at an upper portion of the heating chamber for inserting the vessel into the heating chamber, said heating chamber including a lid for opening or closing the inlet, said lid containing the heating element disposed therein, whereby the vessel is downwardly inserted into the heating chamber through the inlet by orienting the vessel in the proper direction; and a wick holder operatively associated with the heating element for holding the wick from above at a predetermined position such that the wick confronts the heating element of the heating chamber at a predetermined distance from the heating element; wherein by closing the lid after the vessel has been inserted into the heating chamber, the wick is held at the predetermined position by the wick holder so as to confront the heating element at the predetermined distance from the heating element.

6. The electric insecticidal apparatus as claimed in claim 5, further comprising:

a guide provided on the vessel and a guide groove provided in the heating chamber and engageable with the guide;

wherein a flange portion is formed by burrs produced during a molding process of the vessel and is used as the guide.

* * * * *